July 8, 1924.

D. C. STOPPENBACH

MOTOR VEHICLE CONSTRUCTION

Filed May 28, 1920

Inventor
Donald C. Stoppenbach

By
Pennie, Davis, Marvin & Edmonds Attorneys

July 8, 1924.

D. C. STOPPENBACH 1,500,160

MOTOR VEHICLE CONSTRUCTION

Filed May 28, 1920   3 Sheets-Sheet 2

Inventor
Donald C. Stoppenbach

Pennie, Davis, Marvin and Edmonds Attorneys

July 8, 1924.

D. C. STOPPENBACH

MOTOR VEHICLE CONSTRUCTION

Filed May 28, 1920  3 Sheets-Sheet 3

1,500,160

Inventor
Donald C.
Stoppenbach

Pennie, Davis, Marvin & Edmonds Attorneys

Patented July 8, 1924.

1,500,160

UNITED STATES PATENT OFFICE.

DONALD C. STOPPENBACH, OF NEW YORK, N. Y., ASSIGNOR TO STEINMETZ ELECTRIC MOTOR CAR CORPORATION, OF NEW YORK, N. Y., A CORPORATION OF MARYLAND.

MOTOR-VEHICLE CONSTRUCTION.

Application filed May 28, 1920. Serial No. 384,790.

*To all whom it may concern:*

Be it known that I, DONALD C. STOPPENBACH, a citizen of the United States, residing at New York, in the county of New York, State of New York, have invented certain new and useful Improvements in Motor-Vehicle Constructions; and I do hereby declare the following to be a full, clear, and exact description of the invention, such as will enable others skilled in the art to which it appertains to make and use the same.

One object of this invention is to provide a resilient support for the power and drive unit of a motor vehicle between the chassis frame and the unit. A further object is to provide a flexible mounting for the chassis frame wherein all torque or other strains due to stopping, starting, or accelerating the motor, as well as shocks incidental to the operation of the vehicle over poor roads, are substantially absorbed, either by the direct action of the resilient support, or by co-action between the flexible mounting and the resilient support.

To this end, a power and drive unit is provided which comprises a motor and motor casing, reduction gearing and gear reduction casing, and rear axles and a housing therefor. The motor is preferably a dual rotation electric motor, having its armature and field structure adapted to rotate in opposite directions. Suitable transmission and reduction gearing interposed between the motor elements and the independently driven driving axles may provide for the proper speed reduction in such a manner as to eliminate the necessity for a differential. Two types of this form of drive are more fully described in my copending applications Serial No. 384792 and Serial No. 384791 filed concurrently herewith. Each of the casings and the housing may be fastened together by bolts, or otherwise, at flanges formed on the ends of the casings and at the central portion of the housing. In this way a very rigid and compact power and drive unit may be obtained, having its power and drive mechanism supported within the respective casings and the housing. The unit may be supported at the motor casing by means of torque absorbing and suspension springs, or other resilient means, provision being made for the actual displacement of the unit.

The portions of the rear axle housing upon which the rear springs and rear spring seats of a vehicle are usually fixed, may be adapted to serve as journals for bearings upon which the rear spring seats may be mounted. This construction permits the chassis frame, the rear springs and the rear spring seats to freely rotate about the rear axle housing, as well as permitting the rear axle housing to rotate with respect to the frame. With this construction, no strains are developed in either the housing itself or the chassis frame, due to a rotary movement of the housing within the spring seat and bearing, or to a rotary movement of the chassis frame with respect to the housing. This type of flexible mounting is particularly advantageous because of its shock absorbing qualities.

It will be observed that the reduction gearing, gear reduction casing, the motor and the motor casing form an effective torque arm aside from the independent restraining action of the torque and suspension springs. For example, when the vehicle is started or accelerated forwardly, the effective weight of the motor, reduction gearing and respective casings, counteract to a great extent the reactive tendency of this unit to rise. When the vehicle is started rearwardly, however, the weight of the motor, etc., adds to the reactive tendency of the mechanism to move downwardly, and the torque absorbing and suspension springs must, of necessity, absorb the resulting strain, as well as restrain the movement of the torque arm. In either case, however, substantially no strains or shocks are produced in the chassis frame, since the rear spring seat bearings permit the housing to rotate freely within these bearings.

The facility with which the power and drive unit may be disconnected from the chassis frame for the purpose of repair is a further feature of this invention and it is inherent in the construction and arrangement of the power and drive unit and flexible mounting. The arrangement of the power and drive unit comprising the motor and motor casing, reduction gearing and gear reduction casing, and rear axles and the rear axle housing, the resilient support and the flexible mounting, as well as other objects and advantages of the invention will be more clearly understood from a description of certain preferred embodiments thereof as illustrated in the accompanying drawings, in which:—

Figure 1:
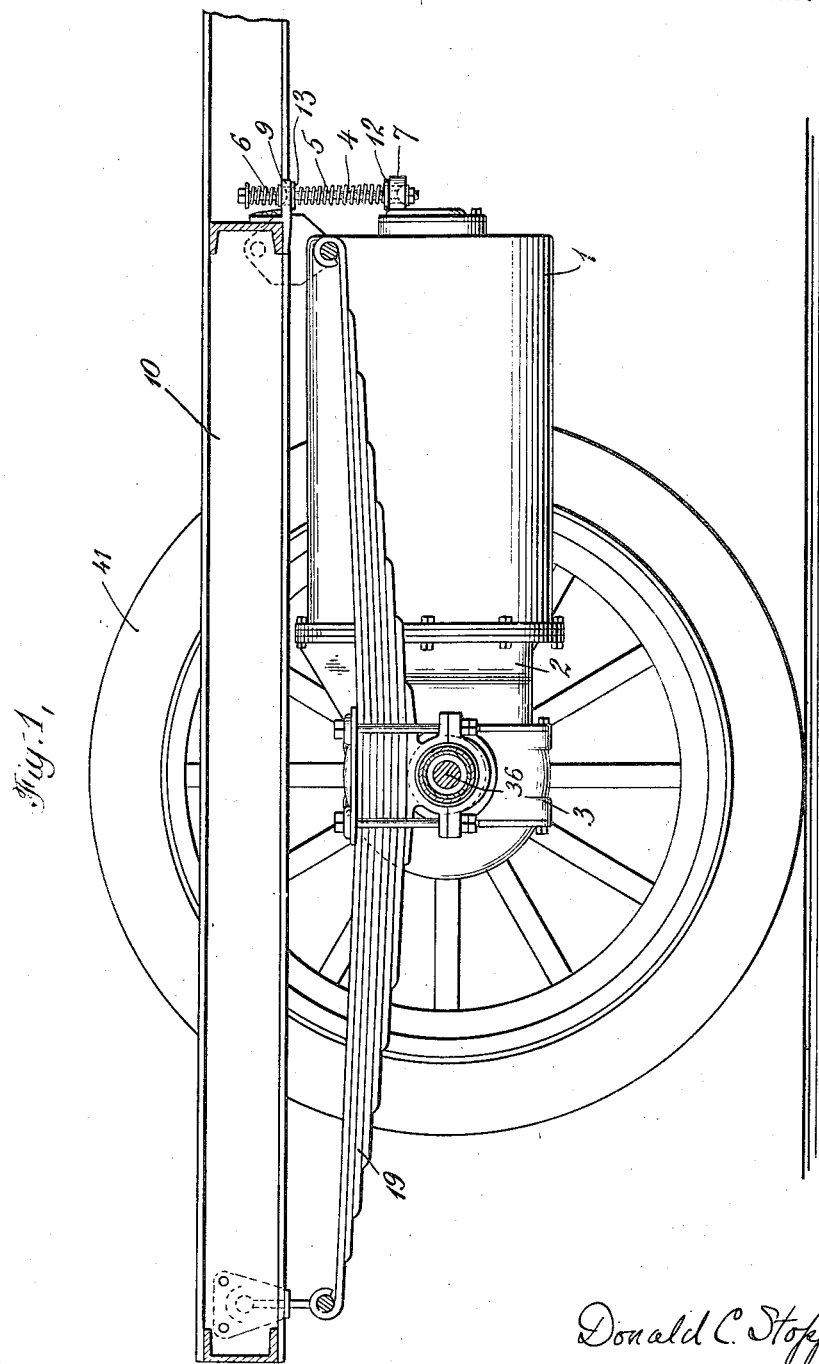
Fig. 1 is a side view of the rear portion of the chassis and frame of an electric motor vehicle showing the manner of supporting the power and drive unit.
Figure 2:
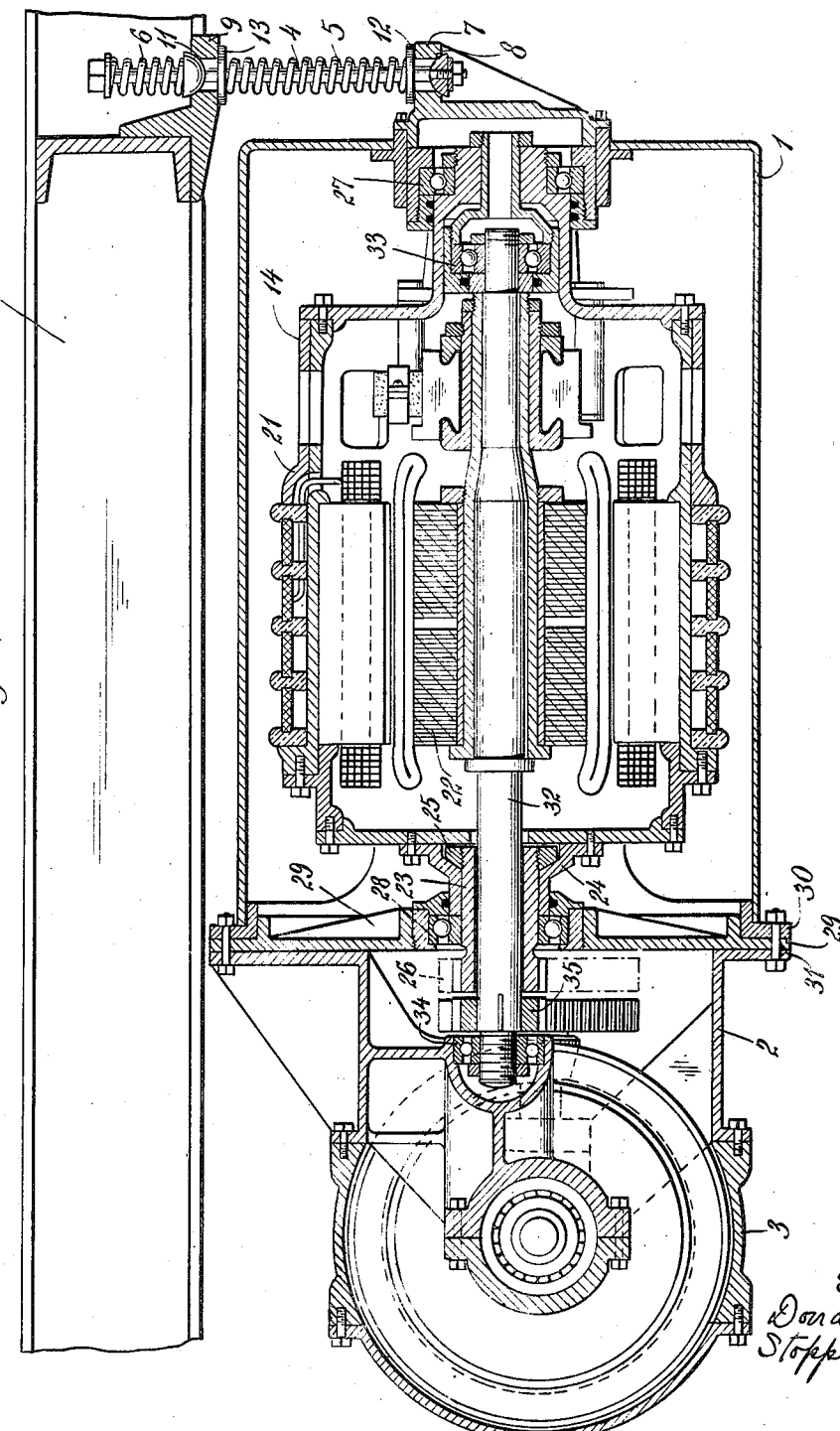
Fig. 2 is a sectional view of the power and drive unit and flexible support, taken along 3—3 of Fig. 3.

In these drawings, the motor casing 1, the gear reduction casing 2, and the rear axle housing 3 are rigidly bolted together to form a single compact power and drive unit. The unit is resiliently supported at the front end of the motor casing 1 by means of a motor hanger bolt 4 and torque and suspension springs 5 and 6. The ball and socket supporting bracket 7 is bolted to the motor casing 1 and houses a ball and socket joint 8. The bolt 4 is supported by the motor hanger bracket 9 which in turn is connected to the chassis frame 10. The motor hanger bracket 9 also houses a second ball and socket joint 11, the ball of which is capable of moving along the bolt 4. The spring 5 is retained between the brackets 7 and 9 by means of washers 12 and 13, respectively, which are adapted to slide on surfaces of the respective brackets during a displacement of the power and drive unit, or during a movement of either of the ball and socket joints.

When the motor 14 is started or accelerated so as to drive the vehicle forwardly, the motor and drive unit will tend to rise due to reaction. Any substantial upward displacement of the motor casing 1 will be prevented by means of the spring 5 which will be compressed during this action between the bracket 9 and the bracket 7. The weight and the effective arm of the motor 14, the motor casing 1 and the reduction gearing and gear reduction casing 2 form a torque arm which counteracts to a great extent, the reactive tendency of the motor and drive unit to rise. The torque arm therefore, aids the spring 5 in restraining the upward movement of the motor casing 1. When the vehicle is started rearwardly, however, the weight and the effective arm of the motor 14, the motor casing 1 and the reduction gearing and gear reduction casing 2 adds to the reactive tendency of the power and drive unit to move downwardly. In this case the spring 6 will be compressed and will restrain the movement of the torque arm. The springs 5 and 6 also serve to absorb shocks produced during the operation of the vehicle over poor roads.

The electric motor 14 is preferably of the dual rotation type in which both the field structure 21 and the armature 22 rotate in opposite directions. It is also reversible thereby enabling the vehicle to be driven either forward or backward according to the direction of rotation of the armature 22 and the field structure 21. The field structure 21 drives the bushing or hollow shaft 23 by means of a sleeve 24, the bushing lock nut 25 effectively locking the bushing 23 to the sleeve 24. Integral with the bushing 7 and at its extremity, a spur gear 26 is formed. The field structure is provided with a front bearing 27 supported by the motor casing 1, and with a rear bearing 28 supported by a grease baffle and bearing spider 29 which in turn is bolted between the flanges 30 and 31 of the motor casing and the transmission and reduction gear casing, respectively. The spider 29 serves as a separator to prevent grease from entering the motor casing 1 from the reduction gear casing 2. The motor armature shaft 32 is provided with a front bearing 33 and a rear bearing 34. In this construction all objectionable strains are transmitted to the casings thereby avoiding ob, tionable local strains which might be produced if the hollow shaft was journaled on the armature shaft.

The spur gears 26 and 35, respectively, drive the countershafts 36 and 37. These countershafts may be provided with suitable transmission and reduction gearing of the types described in the above-mentioned applications Serial No. 384792 and Serial No. 384791 filed concurrently herewith.

Two independently driven drive shafts 38 and 39 are connected, respectively, to the driving wheels 40 and 41 of the vehicle. These shafts are adapted to be driven, respectively, by the countershafts 36 and 37 through the transmission and reduction gearing. Each of the wheels 40 and 41 are, therefore, independently driven, one by the armature of the motor, and the other by the field structure.

Under normal running conditions, for example, when driving the vehicle in a straight line path, the motor armature 22 and the field structure 21 will rotate at equal speeds in opposite directions and will drive the shafts 38 and 39 in the same direction at equal speeds. If, however, the vehicle is directed around a corner, or, in general, is directed in a manner requiring one of the driving wheels to rotate at a higher speed than the other, the necessary differential action is automatically provided between the oppositely rotating armature 22 and the field structure 21. This automatic differential action is equivalent to that obtained with an ordinary differential.

Figure 3:
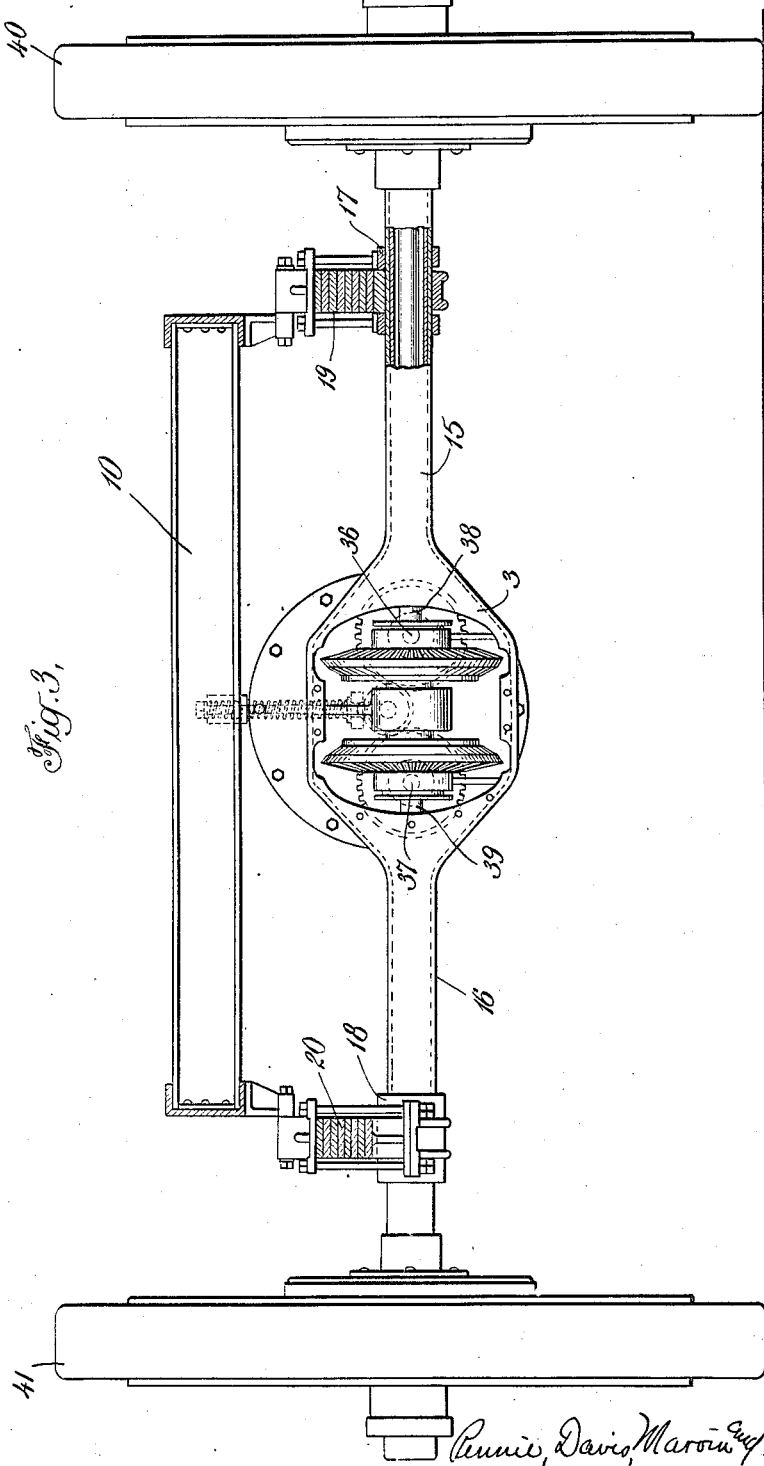
Fig. 3 is an end view of the rear portion of the chassis frame of the vehicle showing the manner of mounting the rear springs and rear spring seats upon the rear axle housing.

Referring now particularly to Fig. 3, the extending portions 15 and 16 of the rear axle housing 3 are adapted to serve as journals for the rear spring seat bearings 17 and 18. The journals and bearings 15, 17 and 16, 18, respectively, permit the chassis frame 10 and the rear springs 19 and 20 to freely rotate about the rear axle housing 3, as well as permitting the rear axle housing 3 to rotate freely within the bearings 17, 18.

In operation, it will be found that torque or other strains, due to stopping, starting, or accelerating the motor, as well as shocks incidental to the operation of the vehicle over poor roads, are substantially absorbed either by the direct action of the resilient support which includes the torque and suspension springs 5 and 6, or by co-action between the flexible mounting, including the rear spring seat bearings 17 and 18 journaled upon the portions 15 and 16, respectively, of the rear axle housing 3, and the resilient support.

I claim:—

1. In a motor vehicle construction, the combination with the chassis frame, of a motor, a driving axle, a housing for said axle, a motor casing, a yielding support for said motor casing comprising a single universally mounted spring-connection between said casing and said frame, which permits the motor casing to move in a vertical plane in both directions from its neutral or rest position, and springs connected to said chassis frame and rotatably mounted on said axle housing.

2. In a motor vehicle construction comprising the chassis frame, a motor, a motor casing, reduction gearing driven by said motor, a casing for said gearing, a driving axle driven by said motor through said gearing, an axle housing, said casings and housing being rigidly fastened together to form a single power and drive unit, a resilient support for said power and drive unit connected between the chassis frame and the unit and permitting vertical movement of said unit in both directions from its neutral or rest position, said reduction gearing being arranged between the motor casing and said housing, rear springs fixed to said frame, seats for said springs, and bearings for said seats journaled on the housing of the rear axle.

3. In a motor vehicle construction comprising the chassis frame, a motor, a motor casing, reduction gearing driven by said motor, a casing for said gearing, a driving axle driven by said motor through said gearing, an axle housing, said casings and housing being rigidly fastened together to form a single power and drive unit, a single universally mounted resilient support for said power and drive unit connected between the chassis frame and the unit and permitting vertical movement of said unit in both directions from its neutral or rest position, said reduction gearing being arranged between the motor casing and said housing, rear springs fixed to said frame, seats for said springs, and bearings for said seats journaled on the housing of the rear axle.

In testimony whereof I affix my signature.

DONALD C. STOPPENBACH.